United States Patent Office 3,242,963
Patented Mar. 29, 1966

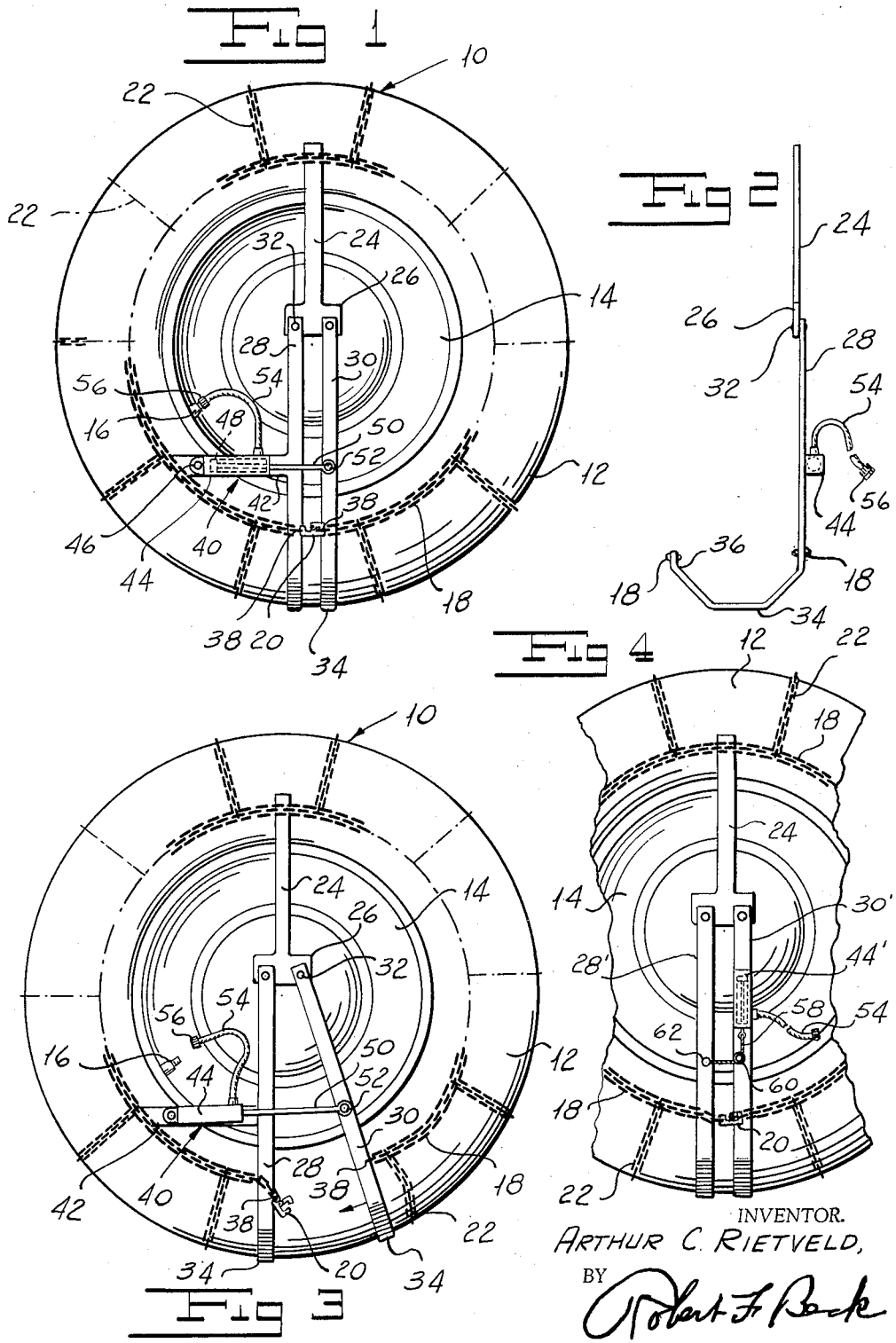

3,242,963
ANTI-SKID CHAIN
Arthur C. Rietveld, Prospect Park, N.J.
(14 Dater St., North Haledon, N.J. 07508)
Filed Jan. 6, 1965, Ser. No. 423,775
6 Claims. (Cl. 152—213)

The present invention generally relates to an anti-skid chain for vehicular wheels and more particularly to such a chain which is quickly and easily attachable and detachable in relation to a vehicle wheel and tire for increasing the traction properties of the vehicular tires.

Anti-skid chains have been in use for many years as a traction aid for vehicle tires, such chains normally including a pair of longitudinal side chains interconnected by a plurality of longitudinally spaced transverse cross chains. The side chains are disposed alongside the side walls of a tire with the cross chains extending across the tread surface of the tire for engaging the ground surface. One of the problems which have existed for many years is the difficulties encountered in securing the chain on the tire in a snug manner. This difficulty has increased in recent years in view of present day vehicle construction in which a substantial peripheral portion of the tire is received in a fender well or recess which prevents freedom of access to a portion of the wheel and inflated tire thereon.

Accordingly, it is the primary object of the present invention to provide a traction chain having a novel structure incorporated therein for urging the ends of the side chains into close proximity for easy interconnection, such novel structure including power means operated by air pressure from the inflated tire on which the traction chain is being mounted.

Another object of this invention is to provide an anti-skid chain in accordance with the preceding object in which the power means includes a pair of members connected with the ends of the chain at one end thereof and being pivotally supported at their other ends at a point in the central area of the wheel. The pair of members have the central portions thereof operatively interconnected by a pnuematically operated piston and cylinder assembly having a flexible hose communicating the cylinder with the pressurized air in the inflated tire by an adapter on one end of the hose for detachable connection with the air valve on the inflated tire.

A further object of the invention is to provide a tire chain that is simple and easy to install, long lasting and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevation of the anti-skid chain of the present invention illustrating its operative relation to the tire;

FIGURE 2 is an end elevation of a portion of the invention;

FIGURE 3 is a side elevation of the chain illustrating the pivotal members in their extended position; and FIGURE 4 is a side elevation of a modified form of the invention.

Referring now specifically to the drawings, the anti-skid chain 10 is mounted on a pneumatically inflated tire 12 mounted on a conventional wheel 14 and provided with the usual air valve 16. The chain 10 includes a pair of longitudinal side chains 18 having a connector 20 at one end thereof. The side chains 18 are interconnected by a plurality of cross chains 22 orientated across the tread surface of the tire 12 in a conventional manner.

Attached to a side chain 18 by any suitable means is a radially extending arm 24 having a bracket 26 on the inner end thereof which is orientated generally at the center area of the wheel 14. A pair of arms 28 and 30 are pivotally attached to the bracket 26 by pivot bolts, rivets or the like at 32. The arms 28 and 30 extend radially of the wheel 14 and tire 12 and terminate in a laterally extending end 34 which extends across the tread surface of the tire 12. The lateral end 34 terminates in a radially inwardly extending portion 36 terminating alongside of the side wall of the tire 12 and connected to the other side chain.

The arms 28 and 30 are connected to the ends of the side chains 18 and 38 for tightening the chain 10 about the tire 12 when the arms 28 and 30 are moved toward each other as illustrated in FIGURE 1 so that the ends of the side chains 18 can be interconnected by the connectors 20 thus mounting the chain 10 on the tire.

Power means 40 is employed to move the arms 28 and 30 toward each other. The power means 40 includes a laterally extending support 42 on the arm 28 and disposed generally parallel to the plane of the tire 12 and wheel 14. A cylinder 44 is pivotally attached to the support 42 by pivot bolt or rivet 46 and a piston 48 having a piston rod 50 rigid therewith is reciprocally disposed in cylinder 44. The piston rod 50 is pivotally connected at its outer end to the arm 30 by a pivot bolt or rivet 52 so that the arms 28 and 30 may be urged towards each other when the piston 48 and rod 50 move inwardly into the cylinder 44. A flexible hose 54 is attached to and communicates with the outer end of the cylinder 44 and the hose 54 has an adapter 56 on the free end thereof for frictional engagement with the air valve 16 for opening the air valve 16 and communicating the pressurized air in the tire with the outer end of the cylinder 44 thereby moving piston 48 and rod 50 inwardly for moving the arms 28 and 30 towards each other for tightening the chain around the tire and enabling the connectors 20 on the side chains to be easily connected for retaining the anti-skid chain 10 in place.

FIGURE 4 illustrates a modified form of the invention and the same reference numerals are used to identify identical parts. In this form of the invention the cylinder 44' is rigidly affixed to the arm 30' and a cable 58 is connected to the piston rod 50' and is entrained around a guide pin, roller or pulley 60 mounted on the arm 30' and the free end of the cable 58 is connected to the arm 28' by an anchor 62.

The operation of both forms of the invention appears clear and the assembly of arms may be left on the vehicle wheel after the chain has been assembled thereon or the assembly may be removed by providing suitable detachable connections between the arms and chains. Inasmuch as the pivot points 32 do not coincide with the center of the wheel, the end portions 34 will move away from the tire when pivoted away from each other thereby enabling assembly and removal of the chain 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An anti-skid chain for vehicular wheels having a pneumatically inflated tire comprising a pair of elongated side chains, a plurality of cross chains interconnecting said side chains at spaced points, connecting means on the ends of said side chains for connecting the ends of the side chains together when assembled on an inflated tire, and power operated means operatively interconnecting the ends of the side chains independently of the connecting means for urging said ends towards each other thereby enabling the connecting means to be operated, said power operated means adapted to be powered from the pressurized air in the inflated tire.

2. The chain as defined in claim 1 wherein said power operated means includes a pair of arms extending radially of the tire and wheel, means pivotally supporting the inner ends of the arms from a side chain, the outer end portion of each of said arms being connected with the ends of the side chains, and a pneumatically operated piston and cylinder assembly interconnecting said arms intermediate the ends thereof.

3. An anti-skid chain for vehicular wheels having a pneumatically inflated tire thereon comprising a pair of elongated side chains, a plurality of cross chains interconnecting said side chains at spaced points, connecting means on the ends of said side chains for connecting the ends of the side chains together when assembled on an inflated tire, and power operated means operatively interconnecting the ends of the side chains for urging said ends towards each other thereby enabling the connecting means to be operated, said power operated means adapted to be powered from the pressurized air in the inflated tire, said power operated means including a pair of arms extending radially of the tire and wheel, means pivotally supporting the inner ends of the arms from a side chain, the outer end portion of each of said arms being connected with the ends of the side chains, and a pneumatically operated piston and cylinder assembly interconnecting said arms intermediate the ends thereof, said cylinder being pivotally attached to one of said arms, said piston having a rigid piston rod extending therefrom, and pivot means connecting the outer end of the piston rod to the other arm.

4. An anti-skid chain for vehicular wheels having a pneumatically inflated tire thereon comprising a pair of elongated side chains, a plurality of cross chains interconnecting said side chains at spaced points, connecting means on the ends of said side chains for connecting the ends of the side chains together when assembled on an inflated tire, and power operated means operatively interconnecting the ends of the side chains for urging said ends towards each other thereby enabling the connecting means to be operated, said power operated means adapted to be powered from the pressurized air in the inflated tire, said power operated means including a pair of arms extending radially of the tire and wheel, means pivotally supporting the inner ends of the arms from a side chain, the outer end portion of each of said arms being connected with the ends of the side chains, and a pneumatically operated piston and cylinder assembly interconnecting said arms intermediate the ends thereof, said cylinder being rigidly affixed to one of said arms in parallel relation to the longitudinal axis thereof, a flexible cable attached to said piston, guide means on said one arm for said cable, and means connecting said cable to the other of said arms in alignment with said guide means.

5. An anti-skid chain for vehicular wheels having a pneumatically inflated tire thereon comprising a pair of elongated side chains, a plurality of cross chains interconnecting said side chains at spaced points, connecting means on the ends of said side chains for connecting the ends of the side chains together when assembled on an inflated tire, and power operated means operatively interconnecting the ends of the side chains for urging said ends towards each other thereby enabling the connecting means to be operated, said power operated means adapted to be powered from the pressurized air in the inflated tire, said power operated means including a pair of arms extending radially of the tire and wheel, means pivotally supporting the inner ends of the arms from a side chain, the outer end portion of each of said arms being connected with the ends of the side chains, and a pneumatically operated piston and cylinder assembly interconnecting said arms intermediate the ends thereof, said means supporting the inner ends of the arms including a radially extending support arm connected with the side chain at its outer end and terminating at its inner end in an enlarged bracket, said pair of arms being pivotally attached to said bracket.

6. An attachment for vehicle anti-skid chains having a pair of side chains comprising a pair of arms extending radially of an inflated tire and wheel assembly, means pivotally supporting said arms adjacent the center of the tire and wheel assembly, said means adapted to be supported from the anti-skid chains, said arms adapted to be connected to the ends of the side chains of the anti-skid chains, and air pressure operated means interconnecting said arms and adapted to be communicated with the inflated tire through the air valve thereon for moving the arms toward each other for moving the ends of the side chains to each other for interconnection.

References Cited by the Examiner

UNITED STATES PATENTS

| | | | |
|---|---|---|---|
| 2,227,601 | 1/1941 | O'Brien | 152—415 |
| 2,472,768 | 6/1949 | Carroll | 152—241 |
| 2,655,972 | 10/1953 | Dowey | 152—213 |
| 2,754,874 | 7/1956 | Gardner | 152—216 |

ARTHUR L. LA POINT, *Primary Examiner.*

C. W. HAEFELE, *Assistant Examiner.*